US012741258B2

(12) United States Patent
Taouk et al.

(10) Patent No.: US 12,741,258 B2
(45) Date of Patent: Sep. 22, 2026

(54) ORGANIC CARBONISATION SYSTEM AND METHOD THEREFOR

(71) Applicant: OCS IP Pty Ltd, Condell Park (AU)

(72) Inventors: Joseph Taouk, Condell Park (AU); Barnaby Jonathan Bruce, Drouin (AU)

(73) Assignee: OCS IP Pty Ltd, Condell Park (AU)

( * ) Notice: Subject to any disclaimer, the term of this patent is extended or adjusted under 35 U.S.C. 154(b) by 561 days.

(21) Appl. No.: 18/005,597

(22) PCT Filed: Jul. 13, 2021

(86) PCT No.: PCT/AU2021/050744

§ 371 (c)(1),
(2) Date: Jan. 13, 2023

(87) PCT Pub. No.: WO2022/011414

PCT Pub. Date: Jan. 20, 2022

(65) Prior Publication Data

US 2023/0264159 A1 Aug. 24, 2023

(30) Foreign Application Priority Data

Jul. 13, 2020 (AU) ................................ 2020902416

(51) Int. Cl.
*B01J 6/00* (2006.01)

(52) U.S. Cl.
CPC ...... *B01J 6/008* (2013.01); *B01J 2219/00074* (2013.01); *B01J 2219/00337* (2013.01)

(58) Field of Classification Search
None
See application file for complete search history.

(56) References Cited

U.S. PATENT DOCUMENTS

| | | | | |
|---|---|---|---|---|
| 4,115,202 | A | 9/1978 | Lorenz et al. | |
| 5,584,970 | A | 12/1996 | Schmalfeld et al. | |
| 6,808,390 | B1 | 10/2004 | Fung | |
| 9,562,194 | B2 | 2/2017 | Kellens et al. | |
| 2008/0147241 | A1* | 6/2008 | Tsangaris ............... | C10K 1/101 700/273 |
| 2012/0017499 | A1 | 1/2012 | Leonhardt | |

(Continued)

FOREIGN PATENT DOCUMENTS

| | | | |
|---|---|---|---|
| AT | 244901 | B | 2/1966 |
| CN | 104560074 | B | 3/2017 |

(Continued)

OTHER PUBLICATIONS

Zheng et al. CN207839569U-translated document (Year: 2018).*

(Continued)

*Primary Examiner* — Jelitza M Perez
(74) *Attorney, Agent, or Firm* — Whitmyer IP Group LLC

(57) ABSTRACT

An organic carbonisation system (OCS) and method therefor that includes a reactor vessel, a circulation fan, a separator, and a gas heating system arranged in a pressurised heating circuit filled with heating gas. The heating gas heats a feed of waste organic matter in a pressurised oxygen deficient environment in the reactor vessel under conditions for its carbonisation. The OCs further includes a separator and a cooling system for cooling carbonised organic waste from the reactor vessel.

12 Claims, 9 Drawing Sheets

(56) References Cited

U.S. PATENT DOCUMENTS

| | | | |
|---|---|---|---|
| 2012/0085023 | A1 | 4/2012 | Teal et al. |
| 2013/0075244 | A1 | 3/2013 | Eyer et al. |
| 2013/0105295 | A1 | 5/2013 | Eyer et al. |
| 2013/0232863 | A1 | 9/2013 | Stromberg et al. |

FOREIGN PATENT DOCUMENTS

| | | | | | |
|---|---|---|---|---|---|
| CN | 207839569 | U | * | 9/2018 | |
| DE | 102009052902 | A1 | | 10/2010 | |
| EP | 2385096 | A2 | * | 11/2011 | .............. C10L 5/447 |
| EP | 3178906 | A1 | | 6/2017 | |
| WO | 2010128209 | A1 | | 11/2010 | |
| WO | WO-2012113979 | A1 | * | 8/2012 | ................ C10L 9/08 |
| WO | 2019227162 | A1 | | 12/2019 | |

OTHER PUBLICATIONS

International Search Report and Written Opinion of the International Searching Authority; Application No. PCT/AU2021/050744; Completed: Sep. 14, 2021; Mailing Date: Sep. 14, 2021; 10 Pages.

Written Opinion of the International Preliminary Examining Authority; Application No. PCT/AU2021/050744; Issued: Aug. 1, 2022; 5 Pages.

* cited by examiner 1000
1500
1530
1520
1510
1070
1200
1050d
1060
1080
1050c
1400
1050b
1050e
1300
1100
1420
1050a
1110
1140
1112
1114
1112
1010
1120
1130

2000
2400
2410
2300
2200
2412
2100
2130
T
P

ORGANIC CARBONISATION SYSTEM AND METHOD THEREFOR

TECHNICAL FIELD

The present invention relates to an organic carbonisation system for carbonising of organic matter, and in particular to an organic carbonisation system for carbonising of waste organic matter.

The invention has been developed primarily for use in/with carbonising waste organic matter and will be described hereinafter with reference to this application. However, it will be appreciated that the invention is not limited to this particular field of use, and could for example, be used in the pyrolysis of coal or other similar organic matter.

BACKGROUND

At present, large amounts of organic waste is produced by society. This includes waste generated from households, hospitals, municipal councils, and industry. Such waste is of a wide variety of sizes and shapes, and may include pathogenic material.

The burning of organic waste in a furnace is not ideal as this results in the release of large amounts of carbon dioxide and carbon monoxide, further fueling global warming.

The present invention seeks to provide an organic carbonisation system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

According to a first aspect, the present invention may be said to consist in an organic carbonisation system (OCS) for carbonizing of organic matter, the organic carbonisation system comprising:

a. a pressurised heating circuit adapted for moving pressurised heating gas between a reactor vessel, a circulation fan and a heating heat exchanger adapted for heating the pressurised heating gas;
b. wherein the reactor vessel is adapted for receiving organic waste and is configured for heating received organic waste by heat transfer from heated working gas in one or more selected from
   i. a packed bed and a fluidised bed.

According to a first aspect, the present invention may be said to consist in an organic carbonisation system (OCS) for carbonizing of organic matter, the organic carbonisation system comprising:

a. a reactor vessel, a circulation fan and a gas heating system adapted for heating pressurised heating gas;
b. a pressurised heating circuit adapted for guiding pressurised heating gas between the reactor vessel, the circulation fan and the gas heating system;
c. wherein the reactor vessel is adapted for receiving organic waste and is configured for heating received organic waste by heat transfer from heated working gas in one or more selected from a packed bed and a fluidised bed.

In one embodiment, the pressurised heating gas provides an oxygen deficient environment in the reactor vessel for the carbonisation of organic waste.

In one embodiment, the OCS further comprises a pressurised cooling circuit adapted for moving a pressurised cooling gas between a. a cooling vessel adapted for receiving hot char from the pressurised heating circuit,
b. a circulation fan, and
c. a cooling heat exchanger adapted for cooling the pressurised cooling gas.

In one embodiment, the organic carbonisation system further comprises a first separator located on the pressurised heating circuit, the separator being configured for separating solid particles from the pressurised heating gas.

In one embodiment, the organic carbonisation system further comprises a second separator located on the pressurised cooling circuit, the separator being configured for separating solid particles from the pressurised cooling gas.

In one embodiment, the organic carbonisation system further comprises a pressurisable first lock hopper located at the inlet to the reactor vessel, the lock hopper being adapted for feeding organic waste and pressurised gas into the reactor vessel.

In one embodiment, the organic carbonisation system further comprises a pressurisable second lock hopper located at the cool char outlet of the cooling vessel, the second lock hopper being configured to be pressurised and for receiving cooled char and gas from the cooling vessel under pressure.

In one embodiment, the organic carbonisation system further comprises a hydraulic seal for receiving pressurised heating gas and solid char particles from the first separator and allowing only the solid char particles to be returned to the reactor vessel.

In one embodiment, the organic carbonisation system further comprises a hydraulic seal for receiving pressurised cooling gas and solid char particles from the second separator and allowing only the solid char particles to be returned to the cooling vessel.

In one embodiment, the organic carbonisation system further comprises a gas heating system configured for heating pressurised gas.

In one embodiment, the organic carbonisation system further includes a carbonisation reactor vessel including an inlet for receiving organic material into the carbonisation reactor vessel.

In one embodiment, the carbonisation reactor vessel further includes an inlet for receiving a heated gas from the gas heating system.

In one embodiment, the inlet is configured to pass heated gas to an underside of the bed.

In one embodiment, the carbonisation reactor vessel further includes a char outlet for the removal of charred organic matter.

In one embodiment, the carbonisation reactor vessel further includes a gas outlet for the removal of heated gas.

In one embodiment, the organic carbonisation system further includes a separator configured for separating charred organic matter and heated gas received from the outlet of the carbonisation reactor vessel.

In one embodiment, the separator is configured for receiving heated gas and charred organic matter from the gas outlet.

In one embodiment, the separator is configured for returning the separated charred organic matter to the carbonisation reactor vessel.

In one embodiment, the separator is configured for transferring the separated charred organic to a hydraulic seal.

In one embodiment, the hydraulic seal includes a liquid container, and includes an inlet for receiving separated charred organic matter and heated gas through liquid in the liquid container to capture the separated charred organic matter, while allowing the heated gas to flow through to the carbonisation reactor vessel.

In one embodiment, the gas heating system comprises a heat exchanger.

In one embodiment, the organic carbonisation system includes passages between the carbonisation reactor vessel, the separator and the heat exchanger disposed in a closed circuit for the recirculation of the pressurised gas.

In one embodiment, the passages are configured to be pressurised.

In one embodiment, the gas heating system includes a primary heat source for heating the pressurised gas in the heat exchanger.

In one embodiment, the primary heat source is powered by one or more selected from:

a. the combustion of hydrogen;
b. electrical heating;
c. focused sunlight;
d. the combustion of waste gases from the organic carbonisation system;
e. or any other suitable heating source.

In one embodiment, the separator is a cyclonic separator.

In one embodiment, the char outlet is closed by a carbon outlet gate valve.

In one embodiment, the carbon outlet gate valve is a perforated gate valve.

In one embodiment, the organic carbonisation system further comprises a lock hopper at the char outlet of the carbonisation reactor vessel.

In one embodiment, the separated charred organic matter is fed to the hydraulic seal.

In one embodiment, the separator is configured to direct separated heated gases to a pressure control valve.

In one embodiment, the separator is configured to direct separated heated gases to a flare stack.

In one embodiment, the organic carbonisation system further comprises a circulation pump for circulating the pressurised gas around the closed circuit.

In one embodiment, the circulation pump is a fan.

In one embodiment, the gas heating system includes a recuperator configured for transferring heat from fluids received from the heat exchanger to fluids being transferred to the heat exchanger.

In one embodiment, the recuperator includes a heat exchanger.

In one embodiment, the organic carbonisation system further comprises an organic matter feed hopper.

In one embodiment, the organic matter feed hopper is a pressure vessel.

In one embodiment, the organic matter feed hopper is configured for feeding organic matter into the carbonisation reactor vessel.

In one embodiment, the organic matter feed hopper and carbonisation reactor vessel are separated by a gate valve.

In one embodiment, the organic matter feed hopper and carbonisation reactor vessel separated by a lock hopper.

In one embodiment, the organic carbonisation system further comprises a cooling system.

In one embodiment, the cooling system comprises a cooling chamber.

In one embodiment, the cooling system comprises a fluid cooling system.

In one embodiment, the cooling system comprises a separator configured for separating cooled char from cooling fluid.

In one embodiment, the cooling chamber is a pressure vessel.

In one embodiment, the cooling chamber includes a. an inlet for receiving hot char from carbonisation reactor vessel,
b. a bed of fine particles,
c. an inlet for receiving a cool gas from the gas cooling system, the inlet being configured to pass cooled gas to an underside of the bed.

In one embodiment, the bed of the cooling chamber is a fluidised bed.

In one embodiment, the cooling chamber includes an outlet for the removal of charred organic matter and heated gas from the cooling chamber.

In one embodiment, the cooling chamber includes a cooling circulation pump.

In one embodiment, the cooling circulation pump is a circulation fan.

In one embodiment, the cooling system comprises a cooling heat exchanger.

In one embodiment, the cooling system includes a pressurised cooling circuit extending between the cooling chamber, the cooling separator, a cooling heat exchanger, and the cooling circulation fan.

In one embodiment, the organic carbonisation system further includes a lock hopper at the outlet of the cooling chamber.

In one embodiment, the OCS includes a pre-heating arrangement.

In one embodiment the pre-heating arrangement is configured for using heat from the char received from the reactor vessel to preheat the organic waste feed.

In one embodiment, the preheating arrangement includes a heat exchanger.

In one embodiment, the preheating arrangement includes a preheating conduit.

In one embodiment, the preheating conduit extends from the heat exchanger to the organic waste feed.

In one embodiment, the preheating arrangement includes a pump configured for pumping air along the preheating conduit as a preheating air stream.

In one embodiment, the preheating conduit may be a circuit.

In one embodiment, the heat exchanger is configured for exchanging heat between char received from the reactor vessel and the preheating air stream.

In one embodiment, the heat exchanger is configured to exchange heat with char in the cooling chamber.

In one embodiment, the heat exchanger is located at least partially within the second lock hopper.

In one embodiment, the preheating conduit is pressurised.

In one embodiment, the preheating conduit extends between the first lock hopper and the second lock hopper.

In one embodiment, the preheating conduit extends between the first lock hopper and the second lock hopper, and back to the first lock hopper.

In one embodiment, the heating circuit is unpressurised.

In one embodiment, the preheating conduit extends from the heat exchanger in the cooling chamber to the organic matter feed hopper.

In one embodiment, the preheating conduit vents to atmosphere.

According to a further aspect, the invention may be said to broadly consist in a method of treating organic matter, the method comprising the steps of:

a. pressurising organic waste in a carbonisation reactor vessel in an oxygen reduced environment;
b. heating the organic waste using a heating gas; and
c. cycling the heating gas through a pressurised heating circuit via a circulation pump and a heat exchanger to reheat the heating gas;

In one embodiment, the method includes the step of:

a. cycling the heating gas through a separator to separate charred organic matter from the heating gas.

In one embodiment, the method includes the step of:

a. directing excess pressurised heating gas through a pressure regulating valve.

In one embodiment, the method includes the step of:

a. directing the reheated gas to one or more selected from a packed bed and a fluidised bed in the carbonisation reactor vessel.

In one embodiment, the method includes the step of:

a. feeding organic waste into the carbonisation reactor via a lock hopper.

In one embodiment, the method includes the step of:

a. feeding charred organic waste into a cooling system.

In one embodiment, the method includes the step of:

a. feeding charred organic waste into a cooling system via a lock hopper.

In one embodiment, the method includes the step of:

a. directing cooling gas through a bed of charred organic waste in the cooling system.

In one embodiment, the method includes the step of:

a. directing cooling pressurised gas through a bed of charred organic waste in the cooling system.

In one embodiment, the method includes the step of:

a. cycling the cooling gas through a pressurised cooling circuit via a circulation pump and a heat exchanger to cool the cooling gas.

In one embodiment, the method includes the step of:

a. feeding charred organic waste into a cooling bin.

In one embodiment, the method includes the step of:

a. utilising a preheating arrangement to transfer heat from charred organic waste received from the carbonisation reactor vessel to organic waste feed to be fed to the carbonisation reactor vessel to preheat the organic waste feed.

According to a further aspect, the invention may be said to consist in a control system configured for controlling an organic carbonisation system as described above to carry out the method steps as described above.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION

Figure 1:
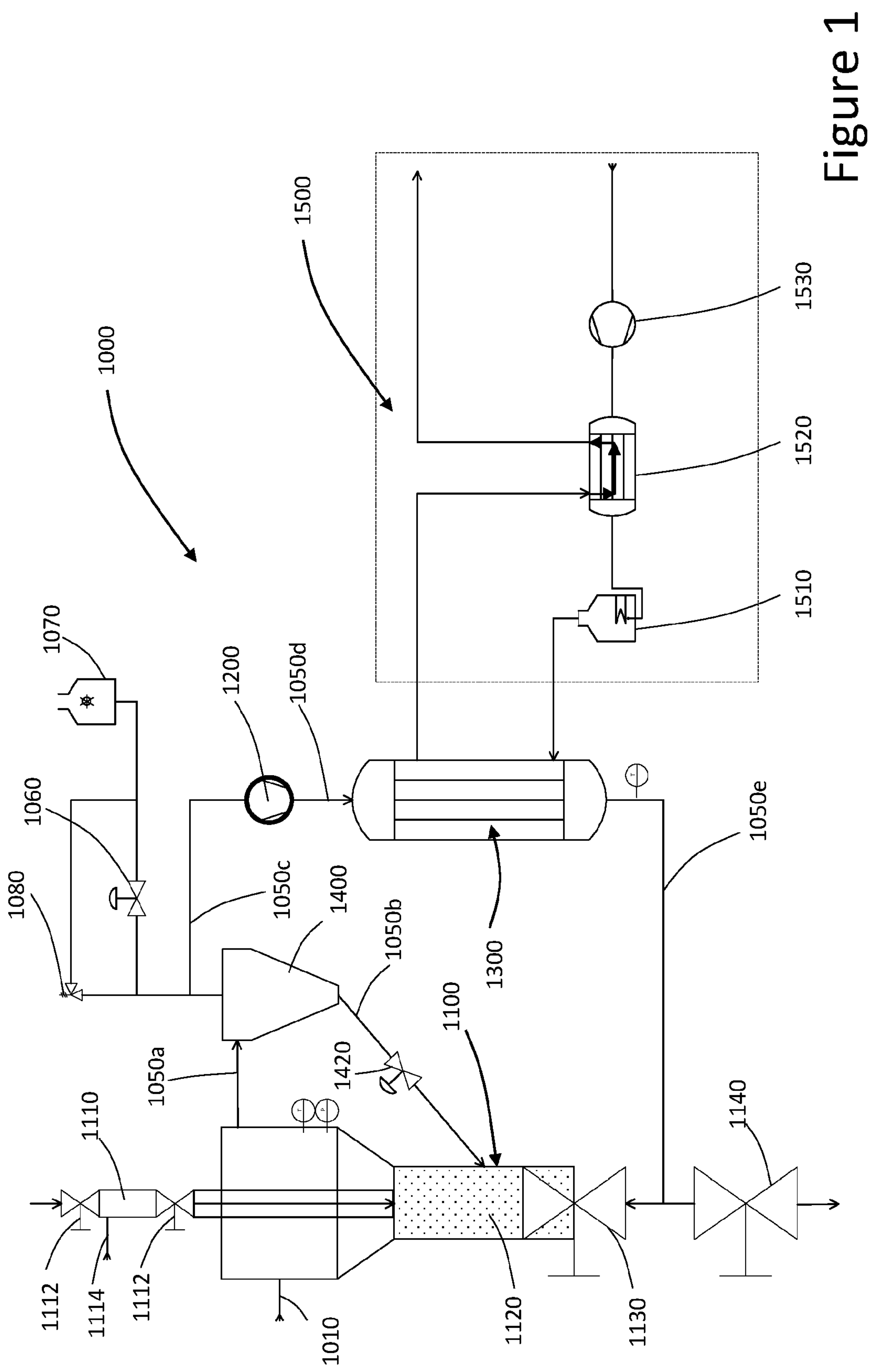
FIG. 1 shows a schematic view of a first embodiment of an organic carbonisation system.

It should be noted in the following description that like or the same reference numerals in different embodiments denote the same or similar features.

An organic carbonisation system according to a first aspect of the invention is generally indicated by the numeral 1000.

Organic Carbonisation System

In one embodiment now described with reference to FIGS. 1 and 4, an organic carbonisation system (OCS) 1000 is provided for carbonising of organic matter. The OCS 1000 includes a reactor vessel 1100, a circulation pump 1200, a heating heat exchanger 1300. The reactor vessel 1100, circulation fan or pump 1200, and heating heat exchanger 1300 are connected together by a pressurised heating passages 1050*a, b, c, d* & *e*, preferably to form one or more closed circuits 1050, through which pressurised heating gas, preferably in the form of nitrogen, is circulated. The nitrogen is preferably provided from a pressurised gas supply 1010.

It is envisaged that a wide variety of alternative heating gases could be used, in order to create an oxygen deficient environment within the reactor vessel 1100 and heating circuit 1050.

The OCS includes a feedstock hopper 1090 a feed screw conveyor 1095, and a funnel 1097 for feeding organic waste 1090 into a feed lock hopper 1110. The feed lock hopper 1110 is adapted to receive organic waste through a waste inlet and be sealed off by isolation valves 1112. The feed lock hopper 1110 is a pressure vessel. The feed lock hopper 1110 includes gas inlet 1114 for receiving heating gas to pressurise the feed lock hopper 1110.

The reactor vessel 1100 is adapted for receiving organic waste via the feed lock hopper 1110 and heating the received organic waste by heat transfer from the heating gas.

The reactor vessel 1100 includes a porous packed bed 1120 configured for supporting organic waste while it is being carbonised. It is envisaged that the reactor vessel 1100 could present a fluidised bed instead of a packed bed.

Underneath the packed bed 1120 is a perforated gate valve 1130. The reactor vessel 1100 further includes an outlet valve 1140 for the egress of hot char from the reactor vessel, preferably into an outlet lock hopper 1160. The outlet lock hopper 1160 includes isolation valves 1162 at each end.

The OCS 1000 further includes a separator 1400, preferably in the form of a cyclonic separator, for removing particles of charred organic waste from the heating gas in the heating circuit coming from the reactor vessel 1100. Alternative types of separators are also envisaged.

The circulation pump 1200, preferably in the form of a circulation fan, serves to pump the pressurised heating gas around circuit 1050 to keep it moving. The heating heat exchanger 1300 is adapted for receiving hot fluid from a heating system 1500, and transferring the heat in the hot fluid to the heating gas, and then returning the heating gas to the reactor vessel 1100 via perforated gate valve 1130. The heating system 1500 will be discussed in more detail below.

Once sufficient organic waste has been carbonised, outlet valve 1140 is opened to allow the charred organic waste (char) to fall out of the reactor vessel 1100. From here, the char may be fed to a cooling system 1600, as will be described in more detail below.

The heating system 1500 for heating the fluid to be sent to the heating heat exchanger 1300 preferably includes a primary heat source 1510, preferably in the form of a furnace. The furnace may be powered by combustion of hydrogen or from other waste heat sources, biofuels, fuels. The furnace may be powered by secondary process and/or waste heat utilisation, such as that from a solid oxide fuel cell. The furnace may be at least partly powered by combustion of volatile gases being emitted from the flare stack. Alternative primary heat sources such as an electrical element powered by preferably green electricity from photovoltaics and wind, preferably coupled with hydro and/or battery storage are also envisaged, as well as solar heating, for example heating by a solar concentrator with or without thermal storage.

The heating system 1500 further includes a fluid supply pump 1530 for pumping fluid such as air or oxygen to the primary heat source 1510. It is envisaged that the fluid passing through the primary heat source 1510 will preferably be a liquid that has the required thermal properties for efficient heat transfer within the heating heat exchanger 1300. The heating system 1500 further includes a recuperator 1520 in the form of a heat exchanger that allows energy in the previously heated fluid returning from the heating heat exchanger 1300 to pre-heat fluid moving towards the primary heat source 1510 from the pump 1530.

More heating gas can be inserted into the circuit 1050 via gas inlet 1010 into the reactor vessel 1100.

In an alternative embodiment (not shown) the fluid passing through the primary heat source 1510 may be connected in a closed circuit. In this way, increased efficiency of heat transfer is envisaged.

Figure 2:
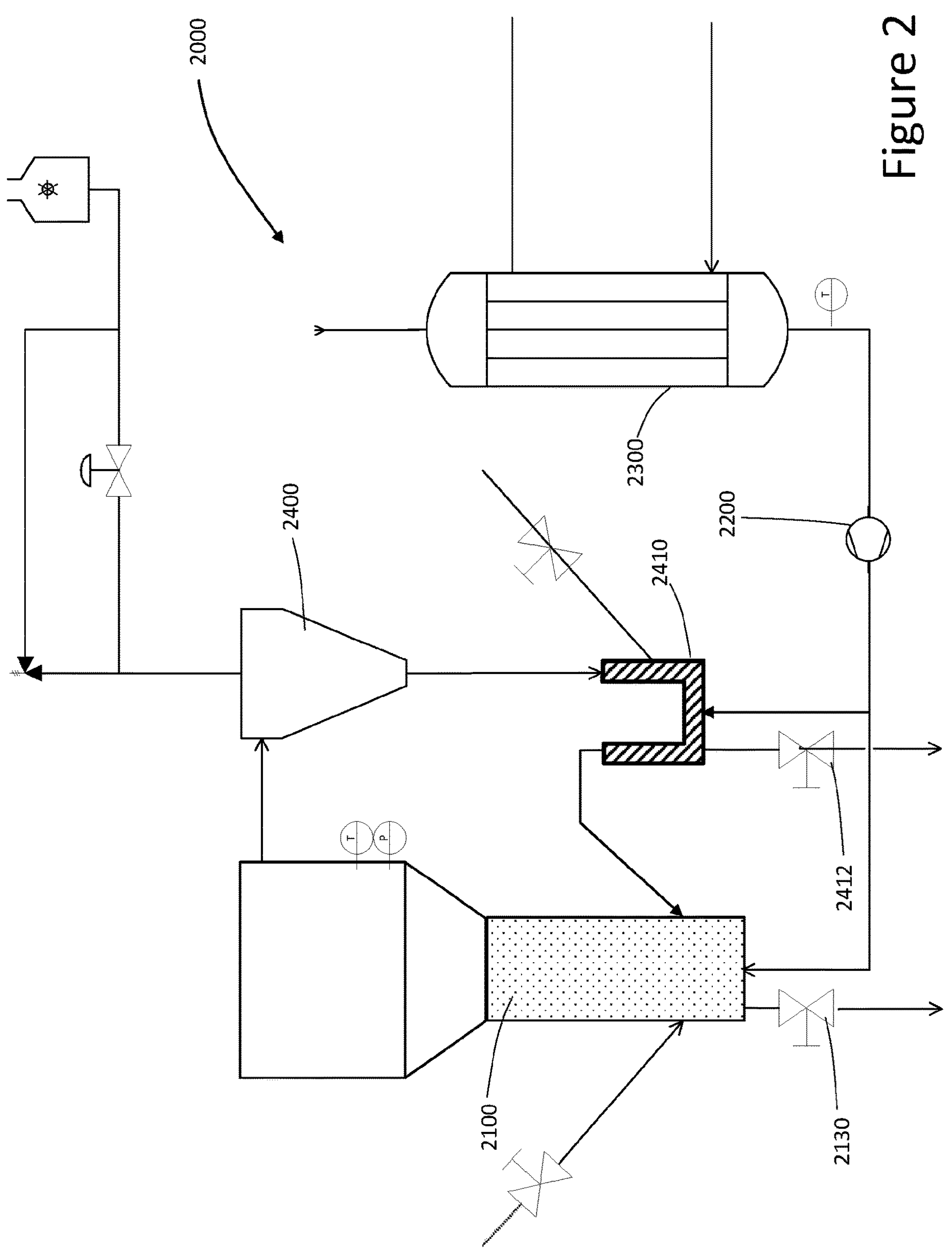
FIG. 2 shows a schematic view of a third embodiment of an organic carbonisation system.

A second embodiment of an organic carbonisation system 2000 is shown in FIG. 2. In this embodiment, the organic carbonisation system 2000 includes a hydraulic seal 2410 that is configured for receiving pressurised heating gas and solid char particles from the separator 2400 and allowing only the solid char particles to be returned to the reactor vessel 2100.

Figure 3:
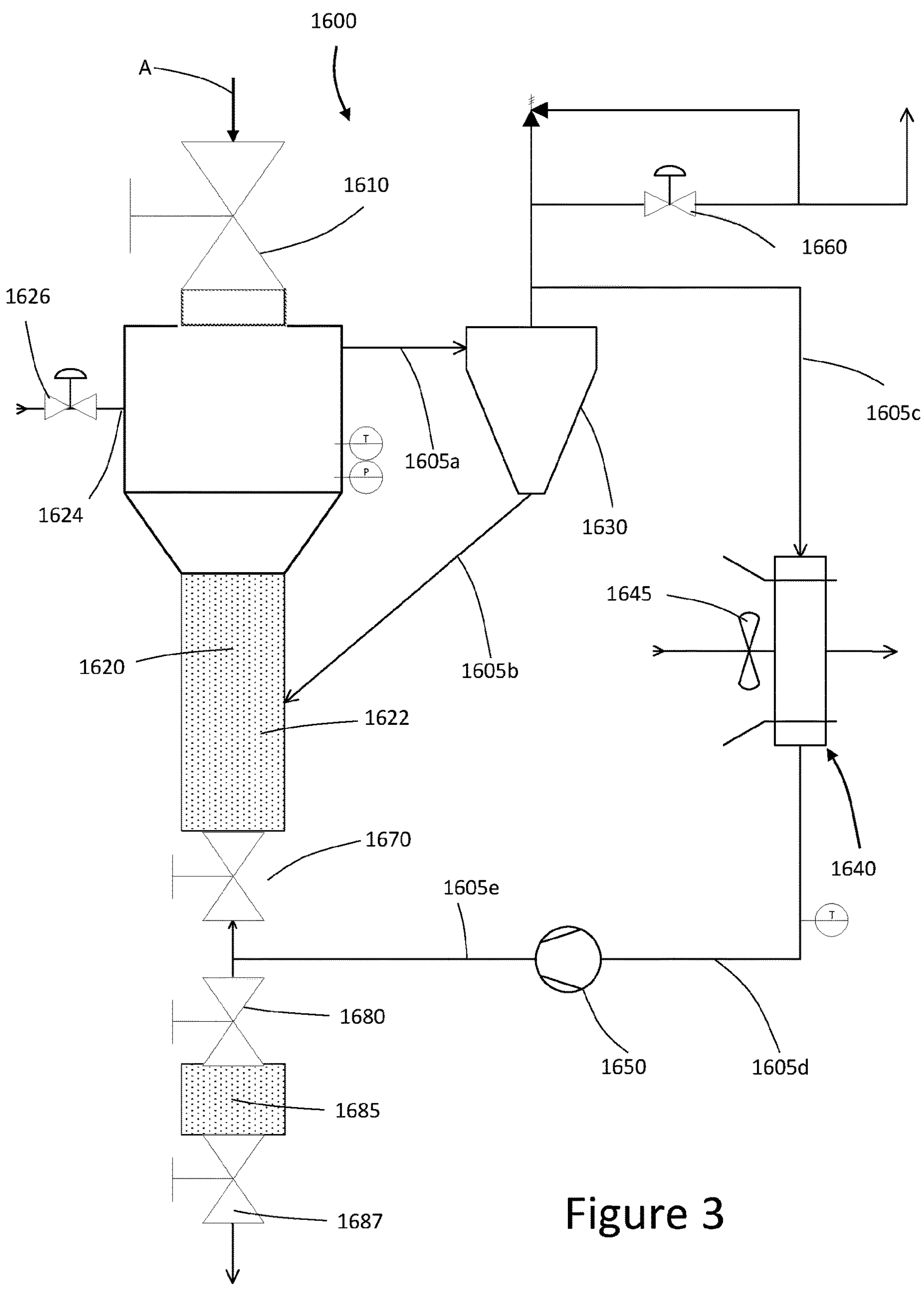
FIG. 3 shows a schematic view of a cooling system for an organic carbonisation system.

A first embodiment of a cooling system 1600 is shown in FIG. 3. The cooling system 1600 has a similar layout to the OCS 1000 shown in FIG. 1, however the cooling system is for cooling the hot char received from the OCS (at arrow A) and cooling it. Importantly, the cooling system 1600 is able to receive the hot char and pressurised heating gas from the OCS without causing the OCS to lose an undue amount of pressure, as will be described in more detail below.

The cooling system includes a cooling chamber 1620, a separator 1630, a cooling heat exchanger 1640 and a circulation pump 1650. These are all connected to each other by a pressurised cooling circuit 1605 including conduits 1605*a, b, c, d & e*. Cooling heat exchanger 1640 is preferably cooled by cooling fan 1645.

The cooling chamber 1620 includes a packed bed 1622. In an alternative embodiment, the cooling chamber 1620 can present a fluidised bed in use, which includes small particles such as sand.

The cooling chamber 1620 includes outlet valve 1680, gas inlet 1624 and control valve 1626 for controlling gas entering via the gas inlet.

The cooling chamber 1620 includes a perforated gate valve 1670 and outlet valve 1680 for the egress of cooled char. The cooling system 1600 further includes a lock hopper 1685 that has isolation valves 1687 on each end. The outlet valve 1680 may act as an isolation valve for the lock hopper 1685. A safety valve 1660 is provided for releasing excess pressure in the cooling circuit 1605.

It is envisaged that in an alternative embodiment (not shown) in order to remove the cold char from the cooling circuit 1605, a hydraulic seal may be provided between the separator and the cooling chamber 1620 similar to the one shown in FIG. 3 above.

Figure 4:
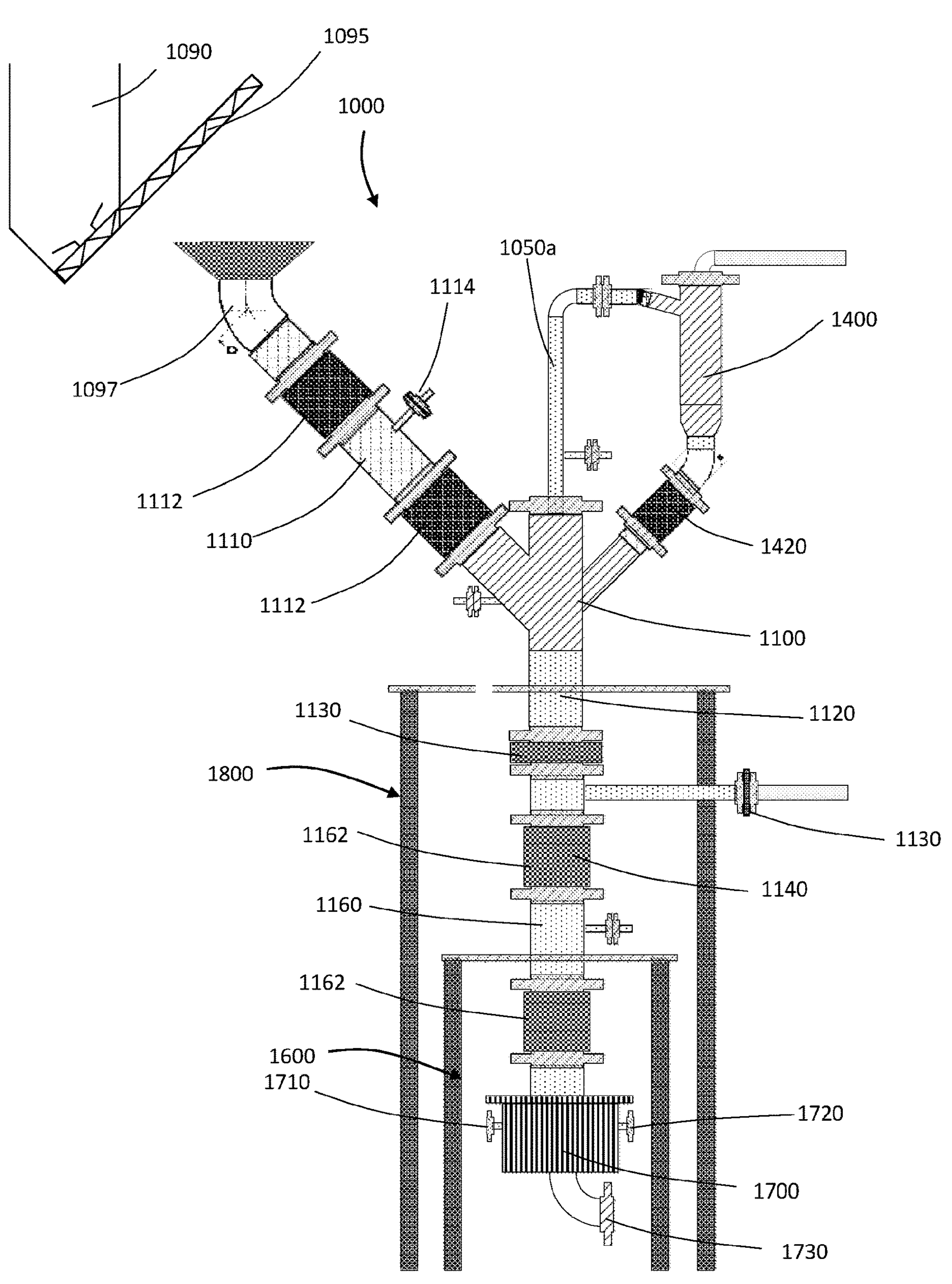
FIG. 4 shows a side view of an organic carbonisation system of FIG. 1.
Figure 5:
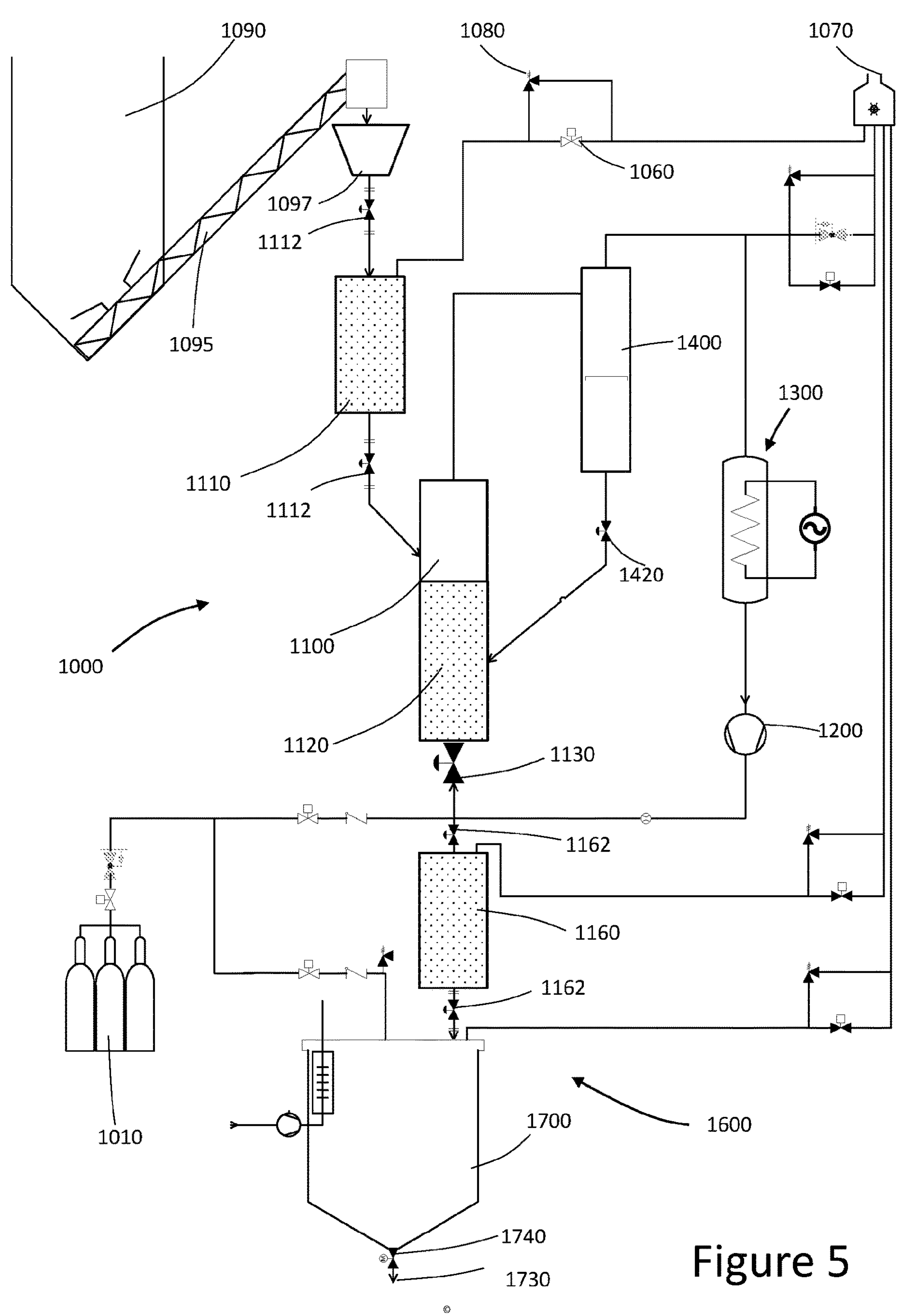
FIG. 5 shows a schematic view of an organic carbonisation system of FIG. 1.

A second embodiment of a cooling system 1600 is shown in FIGS. 4 and 5. The cooling system 1600 includes a cooling bin 1700 that is separated from the outlet valve 1140 of the reactor vessel 1100 by an outlet lock hopper 1160 that is also a pressure vessel. The outlet lock hopper 1160 includes lock hopper isolation valves 1162 above and below it.

The cooling bin 1700 is provided with a cooling gas inlet 1710 and a cooling gas outlet by which a cooling gas such as air can be used to cool the hot char in the cooling bin 1700. Cooled char is able to exit the cooling bin 1700 via char outlet 1730 by opening outlet valve 1740. It is further envisaged that the OCS 1000 will be supported by a support structure 1800 to support the various components structurally.

Figure 8:
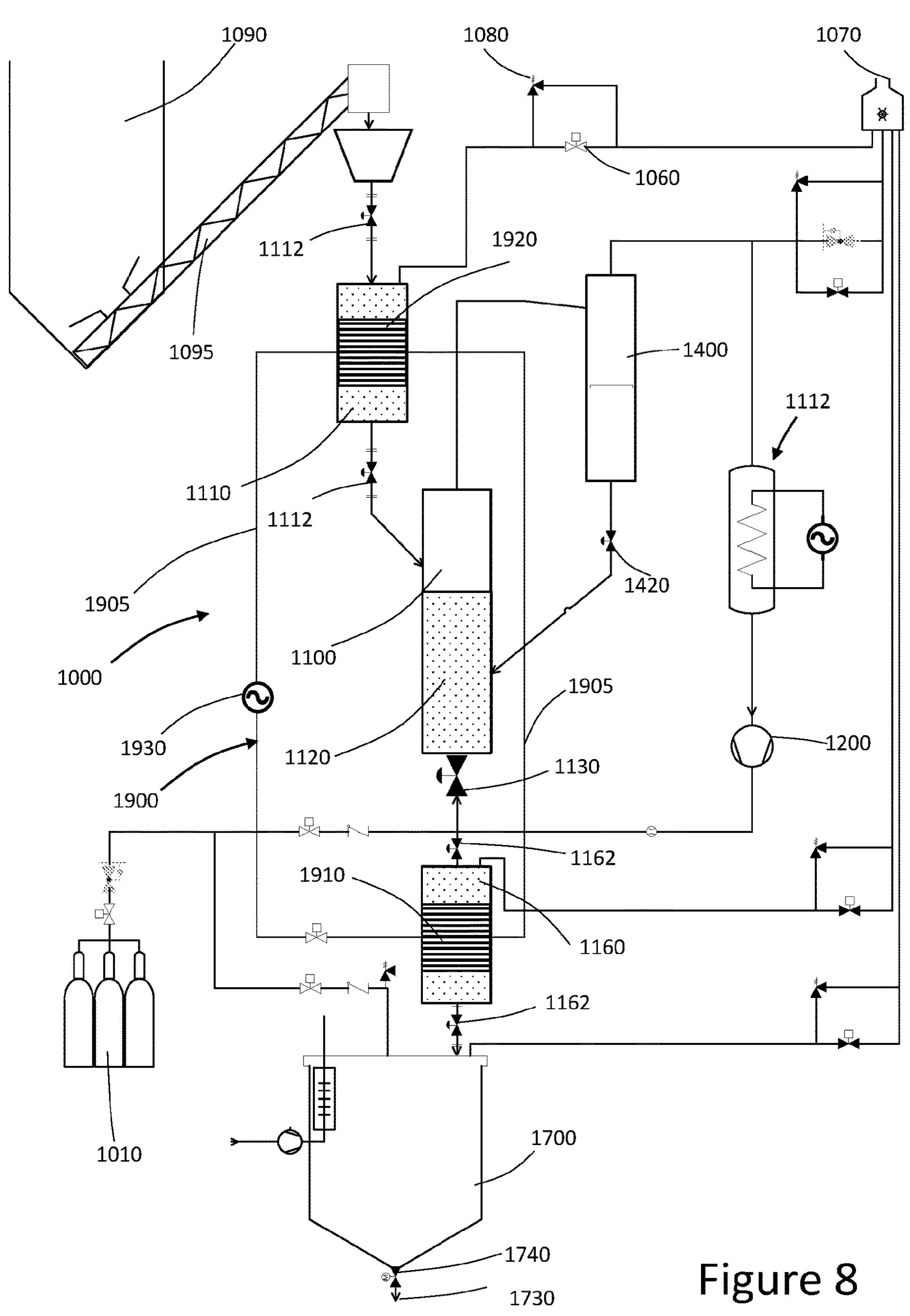
FIG. 8 shows a schematic view of a fourth embodiment of an organic carbonisation system of FIG. 1.

Another embodiment of a cooling system 1600 is shown in FIG. 8. In this embodiment, a preheating arrangement 1900 is provided for preheating organic waste before it enters the reactor vessel 1100, using heat removed from the hot char that has egressed from the reactor vessel. In this embodiment, a closed pre-heating circuit 1905 is provided that extends from the first lock hopper 1110 to the second lock hopper 1160, and back to the first lock hopper. Preheating fluid is contained within the preheating circuit 1905, and the preheating fluid is pumped in a circuit around preheating circuit 1905 by preheating pump 1930.

As part of the preheating arrangement 1900, a first preheating heat exchanger 1910 is provided at the second lock hopper 1160. The first preheating heat exchanger 1910 is configured for facilitating the transfer of heat from the hot char being received into the second lock hopper 1160 to a preheating fluid within the preheating circuit 1905. The preheating fluid may be any suitable gas or liquid.

A second preheating heat exchanger 1920 is provided at the first lock hopper 1110. The second preheating heat exchanger 1920 is configured for facilitating the transfer of heat from the preheating fluid in the preheating circuit 1905, to the organic waste feed in the first lock hopper 1110, thereby preheating the organic waste feed.

In all other respects, the OCS shown in FIG. 8 is substantially identical to the OCS shown in FIG. 5.

Figure 9:
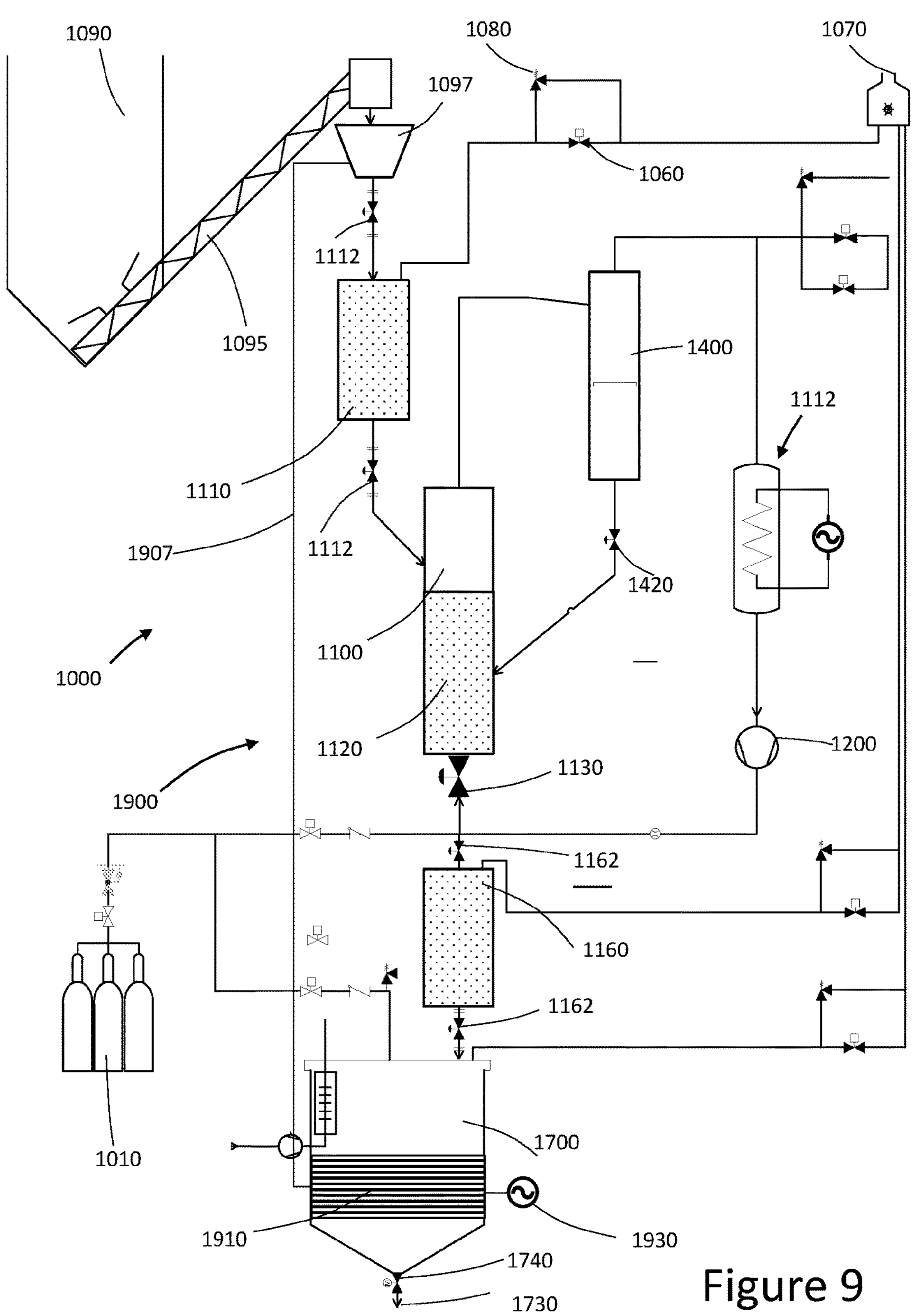
FIG. 9 shows a schematic view of a fifth embodiment of an organic carbonisation system of FIG. 1.

Another embodiment of a cooling system 1600 is shown in FIG. 9. In this embodiment, a preheating arrangement 1900 is also provided. However, the preheating arrangement 1900 shown in FIG. 9 does not include a closed preheating circuit 1905. Instead, a single conduit 1907 is provided that extends from a first preheating heat exchanger 1910 located in the cooling bin 1700. Preheating pump 1930 is provided to push air through heat exchanger 1910, where it is heated up from a heat exchanged from the char, and guided as a preheating air stream via the single conduit 1907 to funnel 1097 where are the heated air is used to pre-heat the organic waste feed in order to either further dry it and/or to increase its temperature closer to the carbonisation temperature in the reactor vessel.

It is envisaged that sensors may be supplied for sensing temperature, pressure, gas and/or fluid flowrates, or the like throughout the OCS. Further, it is envisaged that a control system will be configured to control the OCS to perform the methods set out below. The control system may be provided with the controller, preferably including a processor and digital storage media configured for storing software instructions and/or data, and wherein the software instructions are configured for directing the processor to carry out the steps described below.

Functionality

The functionality of the OCS is now discussed with reference to FIGS. 6 and 7. The process of treatment of organic waste involves subjecting the organic waste temperatures in the range of 300° C.-500° C., and at a pressure of between 3 bar and 10 bar in an oxygen deficient environment for approximately 15-20 minutes or more. Under these conditions, it is envisaged that the solid component of organic waste can be converted to between 93% and 99% char, depending on the type of organic waste input.

Preferably the pressurised heating circuit is filled with an inert gas such as nitrogen, and maintained at a pressure of between 3 bar (300 kPa) and 12 bar (1200 kPa), more preferably between 5 bar (500 kPa) and 10 (1000 kPa), and most preferably between 8 bar (800 kPa) and 10 bar (1000 kPa). This pressure will fluctuate as the processes described below eventuate. Alternative gases other than nitrogen are envisaged, including helium, hydrogen, carbon dioxide, carbon monoxide, argon, ethylene, hydrogen chloride, hydrogen sulphide, neon or any preferably non-explosive combination of these.

It is envisaged that organic waste to be treated will initially be dried and palletised before being transferred to a feedstock hopper 1090 (shown in FIG. 5). From the feedstock hopper 1090, the organic waste is fed 2 through funnel 1097 to a feed lock hopper 1110 on top of the reactor vessel 1100 by feed screw conveyor 1095. The top isolation valve 1112 of the feed lock hopper 1110 will be open to ensure that the organic waste can be fed 2 into the feed lock hopper, while the lower isolation valve 1112 will be sealed to allow for the reactor vessel 1100 to be preheated and pressurised.

The reactor vessel 1100 will be preheated to a temperature of 450° C. at the back bed, and the entire circuit will be purged with nitrogen gas and pressurised to about 10 bar. The circulation fan 1400 will be set to a minimum speed.

The lock hopper 1110 is then sealed 4 by closing the top isolation valve 1112. Once sealed, the lock hopper 1110 receives pressurised heating gas via a gas inlet 1114 to pressurise 6 it, preferably to the same pressure as the reactor vessel 1100. The lower isolation valve 1112 can then be opened 8 to allow the organic waste to be fed into the reactor vessel 1100. In this way, organic waste is fed into the reactor vessel 1100 in a pressurised state.

Advantageously, this reduces the likelihood of a pressure drop in the reactor vessel 1100 when organic waste is fed into the reactor vessel. In any event if pressure falls, more nitrogen may be injected into the system. If pressure increases, the pressure control valve 1060 will vent the excess pressure to the flare stack 1070.

The speed of the circulation pump 1200 is then increased 10 to pump heating gas into the reactor vessel 1100, preferably at a location underneath the packed bed at a temperature of between 300° C. and 800° C., or preferably between 400° C. and 500° C., and most preferably at about 450° C. The temperature of the heating gas can be controlled 12 by controlling the speed of the circulation pump 1200. Should the heating gas be at an excess pressure, a pressure control valve 1060 will open to divert excess heating gas to a flare stack 1070. Safety valve 1080 is further provided should the control of the pressure control valve 1060 fail. Any volatile gases remaining in this vent stream are either diluted and vented, burnt off in a flare stack, or may be processed for downstream by-products, depending on the gas composition and environmental requirements. Pressure may be increased in the reactor vessel 1100 by allowing more nitrogen into the circuit 1050 from a pressurised nitrogen gas supply 1010 using a control valve.

The heating gas rises up through apertures in the perforated gate valve 1130, transferring heat to the organic waste. In an alternative embodiment, it is envisaged that instead of a packed bed, a fluidised bed could be used, wherein the fluidised bed is provided with fine particles such as sand or other known particulates, which may also be of a catalytic nature, which serve to transfer heat to the organic matter. The fine particles of the fluidised bed may also include catalytic particles that increase the rate of carbonisation and/or release of gases from the organic waste.

When a fluidised bed is provided, the circulation pump will be increased 14 in speed until the heating gas moves up through the fine particles of the fluidised bed, causing the fine particles to fluidise. Such fluidised particles assist in the transfer of heat to the organic waste. It is anticipated by the applicant that subjecting the organic waste to these temperatures and pressures over a time period of about 10 minutes-25 minutes, and more preferably 15 minutes-20 minutes, will result in the decomposition of the organic matter into gases and high-purity carbon of between 93% and 99% by weight.

The movement of heating gas through the organic waste may cause smaller particles of charred organic waste to rise up into the reactor vessel. Heating gas, together with fine particulates of charred organic waste will be guided to the separator 1400 via heating passage **1050*a*, where the charred organic particulates will be separated 16 from the heating gas. The separated particulates will then be guided back to the reaction vessel 1100 by heating passage 1050*b*, through control valve 1420**.

Separated heating gas will be guided by heating passage **1050*c* to the circulation pump 1200. From the circulation pump, the heating gas moves via heating passage 1050*d* to the heating heat exchanger 1300**.

From the heating heat exchanger 1300, the heating gas is again transferred back to the reactor vessel 1100 to a location under the packed bed. In this way, the correct temperature conditions for carbonisation can be maintained over the expected time period, while maintaining the correct pressurisation of the heating gas as it is circulated through the heating circuit 1050.

Once sufficient organic waste has been carbonised, outlet valve 1140 is opened 18 to allow the charred organic waste (char) to fall out of the reactor vessel 1100, preferably into an outlet lock hopper 1160. The outlet valve 1140 also serves as an isolation valve for the outlet lock hopper. The outlet valve 1140 will then be closed 20, and the lower isolation valve 1162 of the outlet lock hopper 1160 will be opened 22, allowing the hot char to move into the cooling system 1600.

It is envisaged that using the embodiment of the organic carbonisation system 2000 shown in FIG. 2, charred particular matter that has been separated from the heating gas in the separator 2400 will be fed to a hydraulic seal 2410 that allows the particular matter to be settled out from the heating gas.

The settled charred particular matter can be removed via outlet valve 2412, while the heating gas is returned to the reactor vessel 2100. From the outlet valve 2412, the hot char be treated in the cooling system 1600.

Figure 6:
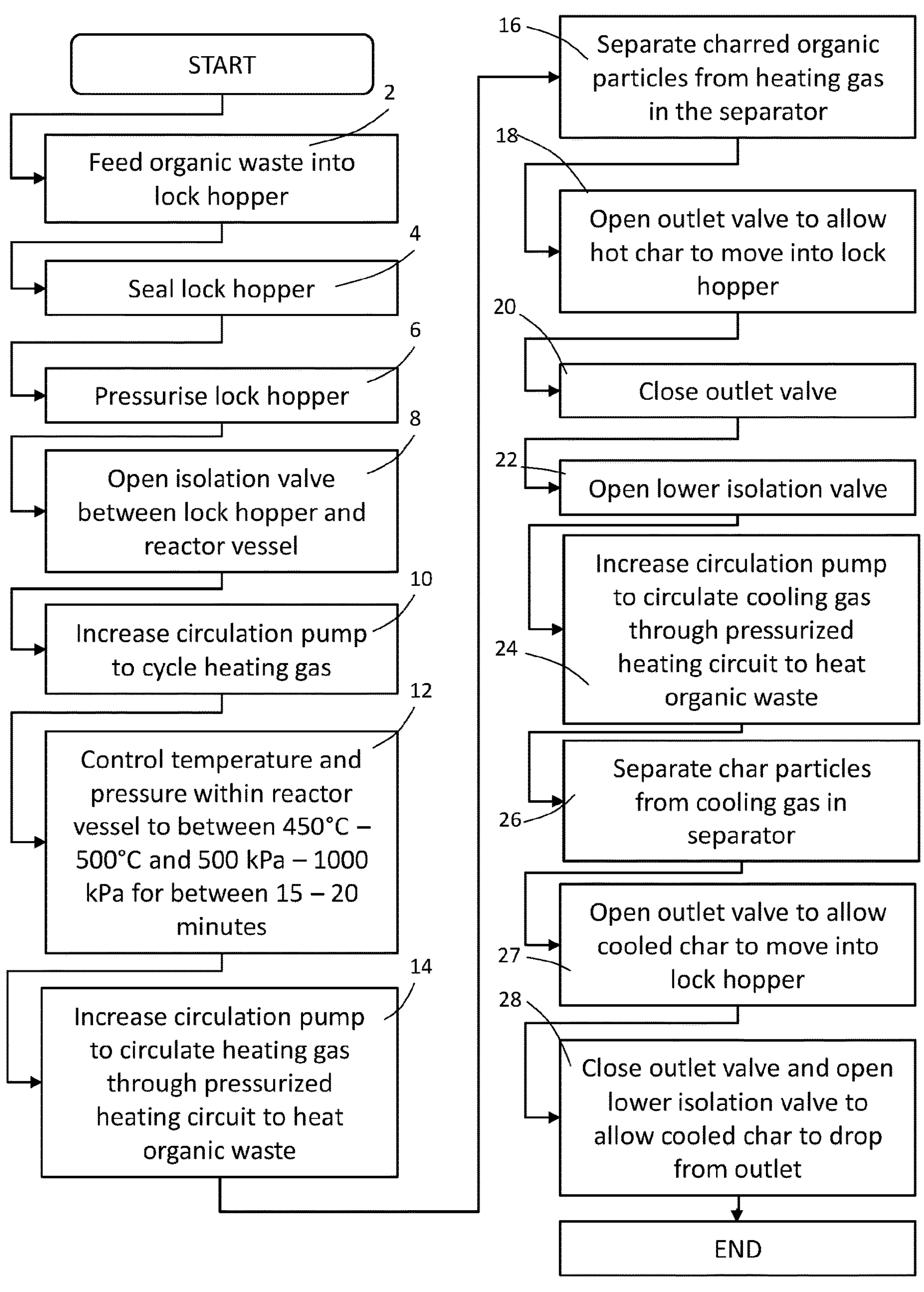
FIG. 6 shows a flow chart showing a first method of treatment of organic waste.

Using the cooling system shown in FIG. 3, and with reference to the process shown in FIG. 6, the hot char is received by opening 22 inlet valve 1610 (which may be the lower isolation valve of the outlet lock hopper), and passes into the cooling chamber 1620 to lie on the packed bed 1622 located above the perforated gate valve 1670.

At this stage, while the hot char is being fed into the cooling chamber, the circulation pump 1650 will be set to minimum, while the cooling circuit 1605 is pressurised at the same pressure as the reactor vessel 1100. It is envisaged that an outlet lock hopper may not necessarily be required between the reactor vessel 1100 and the cooling system 1600 if the cooling system is pressurised to the same pressure as the reactor vessel.

The speed of the cooling circulation pump 1650 will then be increased 24 to circulate the cooling gas through the cooling chamber 1620, separator 1630, cooling heat exchanger 1640, and back to the cooling circulation pump 1650. The circulation pump 1650 moves the cooling gas via conduit 1605*e* to a location underneath a perforated gate valve 1670 or other similar perforated grate formation, and the packed bed 1622. The cooling gas moves through apertures (not shown) in the perforated gate valve 1670 (or where are an alternative perforated grating is used, through the perforated grating) and through porous packed bed 1622, to cool the hot char.

Where a fluidised bed is used, it is envisaged that the speed of the cooling circulation pump 1650 will be increased until the fine particles of the fluidised bed achieve fluid as a. Preferably, the speed of the circulation pump 1650 will be controlled to target a set-point of 90° C. just below the perforated gate valve 1670 (or other perforated grate).

Should particulate matter from the hot char be caught up in the flow of cooling gas around the circuit 1605, it is guided to the separator, where the particular matter is separated 26 from the cooling gas. The separated particulate matter is then guided back to the cooling chamber 1620.

The separated cooling gas is then guided via conduit 1605*c* to a cooling heat exchanger 1640, where the cooling gas is re-cooled. The cooling gas moves from the cooling heat exchanger 1640 back to the circulation pump or fan 1650.

If the pressure of the cooling gas reduces, the amount of cooling gas in the circuit 1605 can be supplemented by pumping more cooling gas into the cooling chamber 1620 via inlet 1624 by opening control valve 1626.

Once the char has been cooled to a temperature below about 100° C., the outlet valve 1680 can be opened 27 and the perforated gate valve 1670 opened to allow the cooled char to move into the lock hopper 1685. The lower isolation valve 1687 of the lock hopper will be closed at this stage. Once the cooled char has moved into the lock hopper 1685, the outlet valve 1680 will be closed 28, retaining the pressure within the cooling circuit 1605. The lower isolation valve 1687 of the lock hopper 1680 will then be opened 28 to let the char fall out of the cooling system.

It is envisaged that heat from the hot char that is transferred to the cooling heat exchanger 1640 can be used to preheat or dry the organic waste before entering the reactor vessel 1100. Preferably the circulation pump 1650 will be set to a minimum while the cold char is being evacuated.

Figure 7:
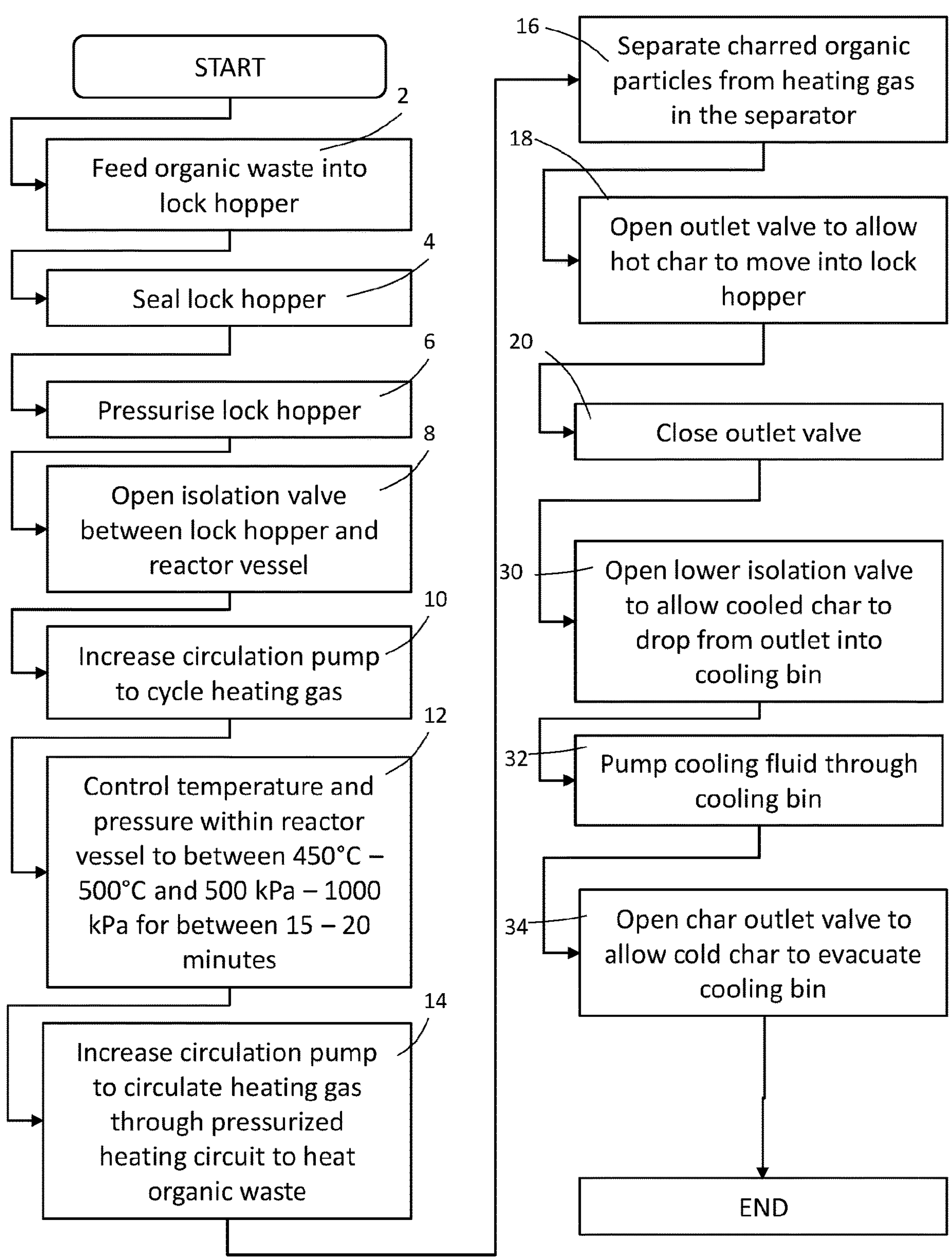
FIG. 7 shows a flow chart showing a second method of treatment of organic waste.

Using the cooling system shown in FIGS. 4 and 5, and with reference to the process shown in FIG. 7, once the organic waste has been carbonised, the outlet valve (or upper isolation valve 1162) is opened 18 to allow the carbonised organic waste to fall into the lock hopper 1160. At this stage, the lower isolation valve 1162 of the lock hopper 1160 will be closed. The outlet valve will then be closed 20, and the lower isolation valve 1162 of the outlet lock hopper 1160 will be opened 30 to allow hot char to fall into a cooling bin 1700.

This allows the pressure in the reactor vessel 1100 to be maintained while the hot char is evacuated from the reactor vessel. It is envisaged that the cooling bin 1700 will not be pressurised. Cooling fluid, preferably in the form of cold air or water, will then be pumped 32 through gas inlet 1710 and out gas outlet 1720 until the char is cooled, after which a char outlet valve 1740 will be opened to allow the char to evacuate the cooling bin 1700.

INTERPRETATION

Markush Groups

In addition, where features or aspects of the invention are described in terms of Markush groups, those skilled in the art will recognise that the invention is also thereby described in terms of any individual member or subgroup of members of the Markush group.

Chronological Sequence

For the purpose of this specification, where method steps are described in sequence, the sequence does not necessarily mean that the steps are to be carried out in chronological order in that sequence, unless there is no other logical manner of interpreting the sequence.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

As used herein the term "and/or" means "and" or "or", or both.

As used herein "(s)" following a noun means the plural and/or singular forms of the noun.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the waste disposal industries.

The claims defining the invention are as follows:

1. An organic carbonisation system (OCS) for carbonizing of organic matter, the organic carbonisation system comprising:

a reactor vessel, a circulation fan and a gas heating system adapted for heating pressurized heating gas;

a pressurized heating circuit adapted for guiding pressurized heating gas at a pressure of between 300 kPa and 1200 kPa between the reactor vessel, the circulation fan, and the gas heating system;

wherein the reactor vessel is adapted for receiving organic waste and is configured for heating received organic waste by heat transfer from heated working gas in one or more selected from a packed bed and a fluidised bed; and wherein the reactor vessel includes a gas inlet for receiving a heated gas from the gas heating system, and wherein the gas inlet is configured to pass heated gas to an underside of the one or more selected from a packed bed and a fluidised bed to generate char; and a preheating arrangement configured for transferring heat from the char in use to pre-heat the organic waste.

2. The OCS as claimed in claim 1, further comprising a pressurized cooling circuit adapted for moving a pressurized cooling gas between:

a cooling vessel adapted for receiving hot char from the pressurized heating circuit;

a circulation fan; and a cooling heat exchanger adapted for cooling the pressurized cooling gas.

3. The OCS as claimed in claim 1, further comprising a pressurizable first lock hopper located at a feed inlet to the reactor vessel, the lock hopper being adapted for feeding organic waste and pressurized gas into the reactor vessel.

4. The OCS as claimed in claim 3, further comprising a pressurizable second lock hopper located at a hot chat outlet of the reactor vessel, the second lock hopper being configured to be pressurized and for receiving hot char and gas from the reactor vessel under pressure.

5. The OSC as claimed in claim 1, wherein the gas heating system comprises a heating heat exchanger disposed on the pressurized heating circuit.

6. The OCS as claimed in claim 5, wherein the gas heating system includes a primary heat source for heating the heat exchanger.

7. The OCS as claimed in claim 1, wherein the reactor vessel includes a char outlet that is closed by a perforated gate valve.

8. The OCS as claimed in claim 5, wherein the gas heating system includes a recuperator configured for transferring heat from fluids received from the heat exchanger to fluids being transferred to the heat exchanger.

9. The OCS as claimed in claim 1, wherein the organic carbonisation system further comprises a pressurized organic matter feed hopper for feeding organic matter into the carbonisation reactor vessel.

10. The OCS as claimed in claim 1, wherein the organic carbonisation system further comprises a cooling system.

11. The OCS as claimed in claim 10, wherein the cooling system comprises a cooling chamber.

12. The OSC as claimed in claim 11, wherein the cooling system further comprises a separator configured for separating cooled char from cooling fluid, a cooling heat exchanger, and a cooling circulation pump in fluid connection with the cooling chamber in a cooling circuit.

* * * * *